United States Patent [19]

Bonner et al.

[11] 4,227,418
[45] Oct. 14, 1980

[54] CAPACITIVE PRESSURE TRANSDUCER

[75] Inventors: John J. Bonner, Philadelphia; C. William Clayton, Hatboro, both of Pa.

[73] Assignee: Fischer & Porter Company, Warminster, Pa.

[21] Appl. No.: 78,203

[22] Filed: Sep. 24, 1979

[51] Int. Cl.³ ............................................. G01L 9/12
[52] U.S. Cl. ........................................ 73/706; 73/718; 73/724; 361/283
[58] Field of Search ......................... 73/724, 718, 706; 361/283

[56] References Cited

U.S. PATENT DOCUMENTS

| | | | |
|---|---|---|---|
| 3,859,575 | 1/1975 | Lee et al. | 73/724 |
| 4,041,761 | 8/1977 | Conti | 73/706 |
| 4,169,389 | 10/1979 | Yasuhara et al. | 73/718 |

*Primary Examiner*—Donald O. Woodiel
*Attorney, Agent, or Firm*—Michael Ebert

[57] ABSTRACT

A capacitive pressure transducer constituted by a pressure sensor whose capacitance is caused to vary as a function of an applied pressure and a coupling assembly adapted to hydraulically convey the variable pressure of the fluid to be metered to the pressure sensor while isolating the structure of the sensor from the fluid. The sensor is formed by a cylinder, one end of which is enclosed by a deformable diaphragm that serves as one plate of a capacitor, deformation of the diaphragm in response to pressure acting to vary the dielectric spacing between the diaphragm plate and a second plate to produce a corresponding change in the value of the capacitance. The coupling assembly includes a body component having a column section and a base section, the column section being received within the cylinder of the sensor with its head spaced from the diaphragm to define therewith a sensor chamber which communicates through a passage in the column section with an isolation chamber formed at the bottom of the base section and sealed by a barrier diaphragm. The chambers and the passage are filled with hydraulic fluid whereby pressure applied to the barrier diaphragm by the fluid to be metered is transmitted to the sensor diaphragm.

9 Claims, 4 Drawing Figures

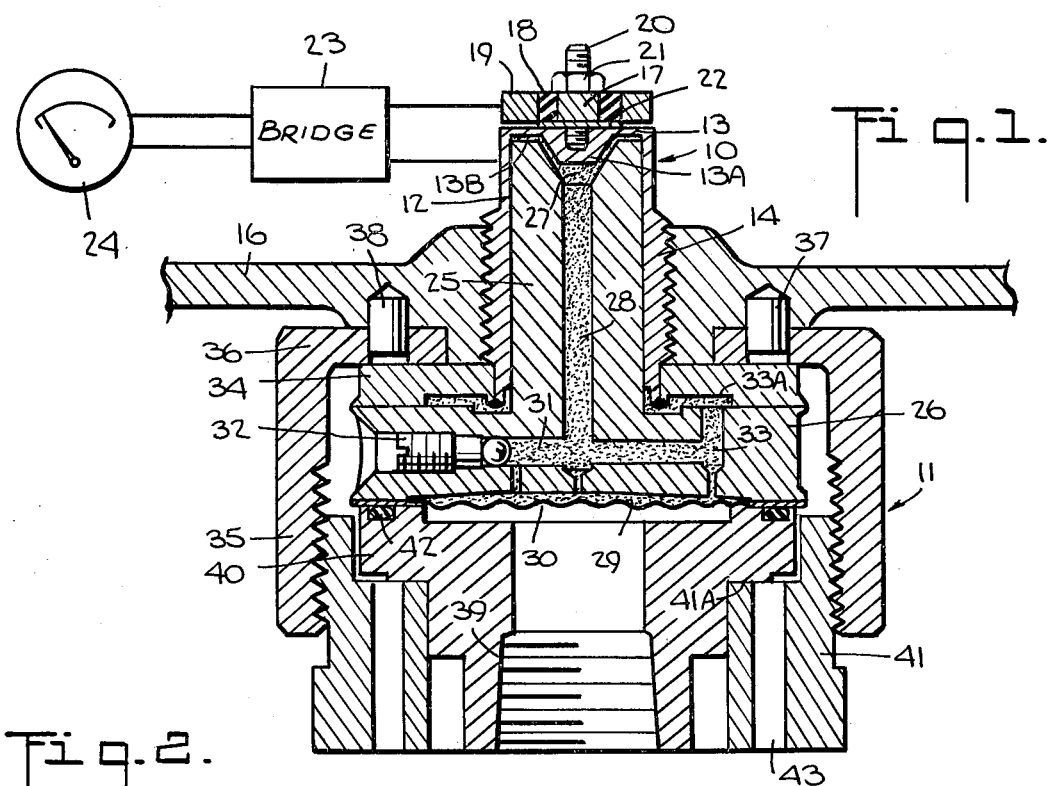
Fig. 1.
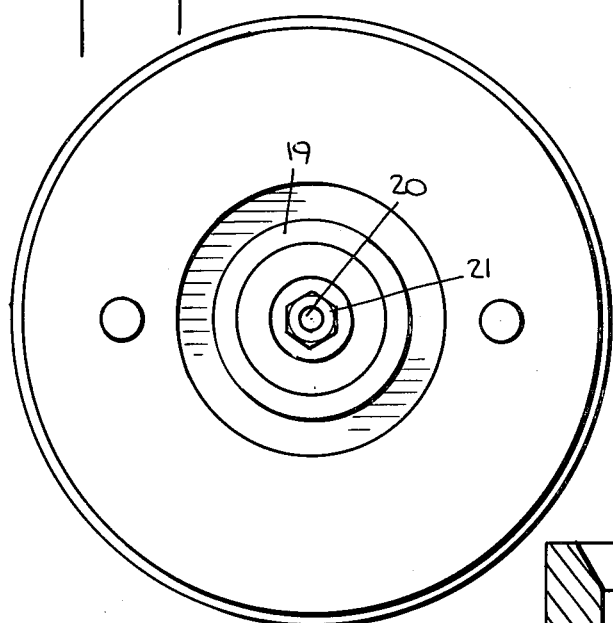
Fig. 2.
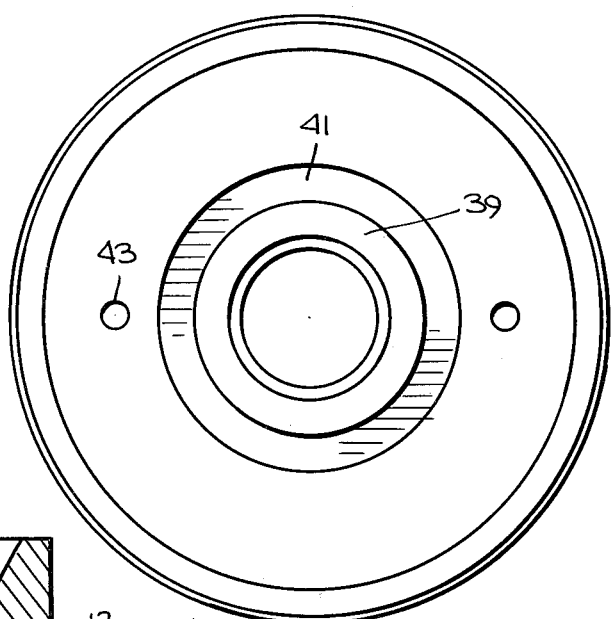
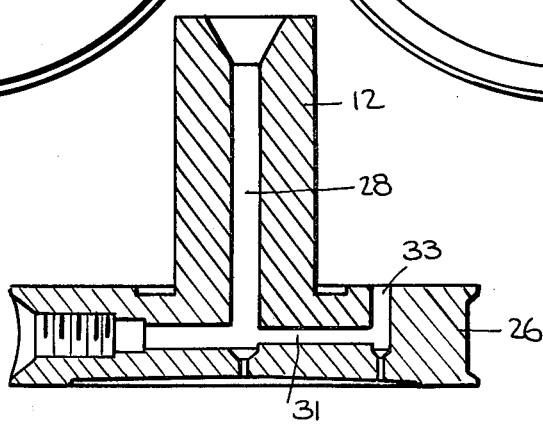
Fig. 4.

CAPACITIVE PRESSURE TRANSDUCER

BACKGROUND OF INVENTION

1. Field of Invention

This invention relates generally to pressure transducers of the type wherein a variable fluid pressure applied thereto gives rise to a corresponding change in capacitance value. Variations in capacitance are convertible into an electrical signal which may be indicated, recorded or transmitted. More particularly, the invention deals with a capacitive pressure transducer which includes a coupling assembly to hydraulically convey the variable fluid pressure to the pressure sensor in a manner isolating the fluid from the sensor structure.

2. Background of Invention

Capacitive pressure transducers are known which include a pressure sensor constituted by two or more plates separated by fluid acting as a dielectric medium, the capacitance value of the sensor being a function of the separation between the plates. The application of fluid pressure to one of the plates which functions as a diaphragm results in a change in separation which is translated into a change in capacitance value.

To convert a change of capacitance value into a corresponding electrical signal for recording, indicating or transmitting changes in pressure, the capacitive pressure transducer may be connected to a capacitance bridge, or it may be included in the tuned resonance circuit of a frequency or phase-modulation system to produce an output signal whose frequency or phase is varied as a function of the applied pressure.

When the fluid pressure to be measured is that encountered in an industrial chemical process, one must take into account the fact that the fluid may be highly corrosive and that its temperature as well as its pressure may vary. To render the pressure transducer relatively immune to high temperature fluids, it is known to form the body and the diaphragm of the transducer from Invar steel and to include a water cooling system in order to minimize the effect of temperature changes on the diaphragm. This cooling serves to maintain the temperature of the transducer within the range in which the low thermal coefficient of Invar is realized. A water-cooled capacitive pressure transducer of the above-described type is disclosed in Section 3-56 of the "Process Instruments and Controls Handbook"—Considine—McGraw Hill Book Company, Inc., 1957.

A water-cooled pressure transducer having an Invar construction is not only costly to manufacture, but the associated water cooling system further complicates and contributes to the overall expense of the installation. Moreover, the metal used in this transducer may not be compatible with many of the corrosive fluid chemicals whose pressures are not to be measured.

The present invention is of particular value in conjunction with a variable-capacitance sensor of the type disclosed in the Lee, et al. U.S. Pat. No. 3,859,575. This sensor includes two capacitance plates connected together at their center to minimize alignment problems and to reduce sources of thermal shift. The Lee et al. arrangement also substantially obviates capacitance shifts due to mounting stresses and acts to enhance the capacitance change resulting from a given pressure-produced motion.

In the Lee et al. pressure sensor, a deformable plate encloses one end of a cylinder into which is introduced the fluid to be metered. The plate formation is such that its central zone dilates in response to an increase in fluid pressure, the annular zone surrounding the central zone and integral with the periphery of the cylinder serving as the first plate of a capacitor. Positioned above the deformable plate and external to the cylinder is a structure constituted by a disc whose center is attached by a stud to the center of the deformable plate. The disc is spaced from the deformable plate by a washer, the disc being encircled by an insulating ring which in turn is surrounded by a conductive ring.

The conductive ring which functions as the second plate of the capacitor is spaced by an air gap from the corresponding annular zone on the deformable plate which functions as the first plate of the capacitor. In operation, an increase in fluid pressure within the cylinder causes the central zone of the deformable plate to dilate and thereby raise the position of the second plate relative to the first plate to lower the capacitance of the sensor.

Though the Lee et al. sensor has many advantages over conventional capacitive pressure transducers, it is not suitable for metering corrosive fluids of the type often encountered in industrial chemical processes, for the metal from which the deformable plate and cylinder of the sensor is made is in some instances reactive with these fluids. And while it would be possible to select a metal or alloy for this purpose which would be compatible with particular chemical fluids, it may not be compatible with others. Moreover, metals chosen for their low thermal coefficient to minimize the effect of temperature changes on the pressure reading may not otherwise have physical characteristics compatible with the fluid being metered.

SUMMARY OF INVENTION

In view of the foregoing, the main object of this invention is to provide a capacitive pressure transducer which includes a coupling assembly serving to convey a variable fluid pressure to a pressure sensor in a manner isolating the fluid from the sensor structure, so that the sensor is unaffected by highly corrosive fluids which, if permitted to make contact therewith, would react chemically with the sensor metal.

More particularly, it is an object of this invention to provide an isolation coupling assembly for a pressure transducer which includes a body component which hydraulically transmits the variable fluid passage to the capacitive pressure sensor and effectively renders the operation of the sensor independent of changes in the temperature of the fluid being metered.

A significant advantage of a capacitive pressure transducer in accordance with the invention is that it makes possible the use of metals for the pressure sensor whose characteristics are appropriate for the sensor without regard to their compatibility with the fluid whose pressure is to be measured, whereas the choice of metal for the detachable pipe connector component of the coupling assembly is determined by its compatibility with the fluid, the connector being replaceable to provide a coupling appropriate to the chemistry of the fluid. Thus a pressure transducer in accordance with the invention maintains optimum pressure sensor characteristics regardless of the fluid being metered.

Briefly stated, these objects are attained in a pressure transducer in accordance with the invention comprising a capacitive pressure sensor in combination with a coupling assembly adapted to hydraulically convey the variable pressure of the fluid being metered to the pressure sensor while isolating the structure of the sensor from the fluid.

The sensor is formed by a cylinder, one end of which is enclosed by a deformable diaphragm, deformation of the diaphragm in response to an applied pressure acting to vary the dielectric spacing between a plate section of the diaphragm and a second plate to produce a corresponding change in the value of the capacitance. In a preferred embodiment, the two capacitor plates are connected together at their centers to minimize alignment problems.

The coupling assembly includes a body component having a column section and a base section, the column section being received within the cylinder of the sensor with its head spaced from the sensor diaphragm to define therewith a sensor chamber which communicates through a passage in the column section with an isolation chamber formed at the bottom of the base section and sealed by a barrier diaphragm. The chambers and the passage are filled with hydraulic fluid whereby pressure applied to the barrier diaphragm by fluid to be metered is transferred to the sensor diaphragm.

Clamped to the base section of the assembly body by means of a shell surrounding the base section and a sleeve which is threadably received within the shell is a flanged connector to which is attachable the pipe carrying the process fluid to be metered, the sleeve including a shoulder which presses against the flange of the connector to urge it against the base section of the body. The metal of the connector is determined by the fluid to be metered, the connector being replaceable to accommodate the assembly to different fluids.

OUTLINE OF DRAWINGS

For a better understanding of the invention as well as other objects and further features thereof, reference is made to the following detailed description to be read in conjunction with the accompanying drawings, wherein:

FIG. 1 is a sectional view of a capacitive pressure transducer in accordance with the invention;

FIG. 2 is a top plan view of the transducer;

FIG. 3 is a bottom plan view thereof; and

FIG. 4 is a separate view of the body component of the isolation coupling assembly included in the transducer.

DESCRIPTION OF INVENTION

Referring now to FIG. 1, there is disclosed a pressure transducer in accordance with the invention, the transducer comprising a capacitive pressure sensor, generally designated by numeral 10, and an isolation coupling assembly to convey the pressure of the fluid being metered to the sensor while isolating the fluid from the sensor structure, the assembly being generally designated by numeral 11.

The pressure sensor 10 is constituted by a hollow cylinder 12, one end of which is enclosed by a deformable plate 13 whose central zone 13A has the formation of a truncated cone. The annular zone 13B which surrounds the center zone and is integral with the end of the cylinder is of reduced cross section to enhance its flexibility. The lower portion of cylinder 12 is provided with an externally threaded section 14, making it possible to screw the pressure sensor into a threaded socket 15 formed in the wall 16 of the instrument housing.

External to the cylinder and mounted above plate 13 is a capacitor structure formed by a central metal disc 17 encircled by an insulating ring 18 which in turn is encircled by an annular metal plate 19. Disc 17 is attached at its center to the center of the central zone 13A in deformable plate 13 by means of a threaded stud 20. The stud is socketed in a threaded bore in the central zone 13A, a nut 21 being provided at the face of the stud to hold the capacitor structure at a position which is spaced from the deformable plate 13 by a planar metal washer 22. In practice, the capacitor electrode could be formed instead by a ceramic disc having gold plating in region 19 to define the electrode.

Cylinder 12 and deformable plate 13 enclosing one end thereof are preferably fabricated of hardened steel to afford good elastic qualities and small hysteresis. Disc 18, stud 20 and nut 21 are preferably made of stainless steel. Insulating ring 18 is preferably formed of glass or ceramic, for this material produces extremely small thermal shifts.

The air gap between annular plate 19 and the corresponding annular zone 13B on the deformable plate 13 acts as the dielectric of the capacitor formed thereby. In practice, the size of this gap is initially about 1 mil, the facing surfaces of the capacitor plates being preferably lapped to extreme flatness.

In operation, a fluid pressure within the cylinder will cause deformation of plate 13, causing dilation of center zone 13A. This acts to raise the capacitor structure attached thereto and to increase the width of the dielectric air gap, thereby decreasing the capacitance value to an extent proportional to the applied fluid pressure. Thus an increase in pressure results in a corresponding decrease in capacitance value and vice-versa.

Annular zone 13B, which forms one plate of the capacitor, and annular plate 19, which forms the second plate thereof, are connected to a bridge circuit or to an electronic system 23 to convert the change in capacitance to an electrical signal which is indicated by meter 24 whose scale is calibrated in terms of fluid pressure. In practice, the signal from system 23 may be transmitted to a remote station for recording or for automatic process control. The electronic system for this purpose may be of the type disclosed in the Lee et al. U.S. Pat. No. 3,518,536 and in the Briefer U.S. Pat. No. 4,093,915.

The isolation coupling assembly 11 associated with the pressure sensor includes a body component having a cylindrical column section 25 and a round base section 26 of greater diameter. Column section 25 is inserted in cylinder 12 so that its head is spaced from deformable plate 13 to define therewith a sensor chamber 27, the head of the column section having a geometry conforming to the geometry of the underside of the deformable plate. Sensor chamber 27 communicates through a central passage 28 in the body component to a shallow isolation chamber 29 formed in the bottom of base section 26. Isolation chamber 29 is sealed by a barrier diaphragm 30 of corrugated construction and high compliance, the diaphragm being formed of a metal such as tantalum which is non-reactive with virtually all fluids encountered in chemical processing.

Interposed between the underside of socket 15 of the instrument housing 16 and the upper face of base section 26 of the body component is an annular transition piece 34, preferably made of stainless steel. The lower end of cylinder 12 of the sensor is welded to the inner periphery of this piece and the upper end of base section 26 is welded to the outer periphery thereof. Sensor chamber 27, isolation chamber 29 and passage 28 coupling these chambers are filled with a hydraulic fluid which is admitted through a lateral duct 31 in the body component that intersects the passage, the duct being sealed by a removable stopper 32. An auxiliary passage 33 communicating with duct 31 supplies hydraulic fluid to a shallow reserve chamber 33A formed in transition piece 34 at its interface with base section 26.

Surrounding transition piece 34 and base section 26 is a stainless-steel shell 35 whose upper end is provided with an inwardly-directed flange 36 that is secured by pins 37 and 38 against rotation. A nipple or pipe connector 39 having an outwardly-extending flange 40 is pressed against the underside of base section 26 by means of a sleeve 41 which telescopes within shell 35 and is threadably received therein, sleeve 41 having a shoulder 41A that bears against the underside of flange 40 of the pipe connector.

A sealing ring 42 is received in an annular groove in the upper end of connector 39 to minimize leakage. The inner diameter of sleeve 41 is slightly greater than the outer diameter of flange 40 of the connector to provide a leakage path which communicates with drainage holes 43 in the sleeve.

Connector 39 is formed of a metal or alloy that is compatible with the chemistry of the fluid whose pressure is to be measured, the connector being internally threaded to receive the pipe carrying the fluid.

It will be seen that barrier diaphragm 29 which is exposed to fluid pressure in combination with the hydraulic fill between this diaphragm and the sensor diaphragm 13 acts to transmit the applied pressure to the capacitive sensor. The construction is such as to provide for a small amount of fill fluid, thereby limiting the ambient temperature error that is a function of fluid quantity and characteristics as well as diaphragm compliance and calibrated span.

As previously noted, the air gap between annular plate 19 and the corresponding annular zone 13B on deformable plate 13 acts as the dielectric of the capacitor formed thereby. It has been found that under humid conditions, especially at the dew point, the dielectric constant of this gap varies unpredictably between 1 and 80, thereby giving rise to an extreme error signal when water condenses in the gap.

The adverse effects of changes in humidity may be eliminated by deliberately filling the air gap with a fluid which is immiscible with water and has a relatively high dielectric constant, such as degassed silicone oil. This oil, which has no air in solution to affect its dielectric properties, has a dielectric constant of 2.9 and is completely immune to water.

With a dielectric between plate 19 and zone 13B having a higher dielectric constant than air, it becomes possible to increase the gap size and yet retain the same initial value of capacitance. Or one may retain the original size of the gap and, without difficulty, modify the electronic circuits associated with the pressure-sensitive capacitor to take account of the higher capacitance produced by the oil.

The preferred procedure for filling the gap with a dielectric fluid is to first evacuate the parts that make up the capacitor, then back-fill with dry nitrogen, after which the region is re-evacuated. Finally, the gap is wet-filled with the fluid dielectric which is preferably degassed silicone.

In order to retain the dielectric fluid in the gap despite external influences which seek to displace the fluid, such as shock, heat and gap changes under pressure, one may rely on the high surface tension of the silicone oil and its constant viscosity.

Another approach toward retaining the fluid in the gap is to contain the fill fluid with a sleeve of soft elastomeric material which has a low gradient and is insoluble in the fill fluid, the material also being resistant to atmospheric contaminants. This readily deformable sleeve will not interfere with the mechanical operation of the variable capacitor. An alternative approach to inhibit the migration of low surface-tension oils, such as silicone, by means of a proprietary antimigration solution painted on the external surfaces of the gap. One such solution suitable for this purpose is NYEBAR-CT. This trade-marked liquid is designed to be applied around oiled areas to retard oil spreading. A solvent evaporates, leaving a polymer film across which lubricants do not spread or creep.

While there has been shown and described a preferred embodiment of a capacitive pressure transducer in accordance with the invention, it will be appreciated that many changes and modifications may be made therein without, however, departing from the essential spirit thereof.

We claim:

1. A capacitive pressure transducer for measuring fluid pressure comprising:
   A. a pressure sensor formed by a cylinder having one end enclosed by a deformable metal diaphragm that serves as one plate of a capacitor whose second plate is spaced from the diaphragm by an air gap constituting the dielectric of the capacitor, deformation of the sensor diaphragm in response to pressure acting to vary the air gap to produce a corresponding change in the value of the capacitance; and
   B. a coupling assembly adapted to hydraulically convey the pressure of the fluid to be measured to the pressure sensor while isolating the structure of the sensor from the fluid, said assembly including a body component having a column section and a base section, the column section being received within the cylinder with its head spaced from the sensor diaphragm to define therewith a sensor chamber which communicates through a passage in the column section with an isolation chamber formed at the bottom of the base section and sealed by a barrier diaphragm, the chambers and the passage being filled with hydraulic fluid whereby the pressure of fluid imposed on the barrier diaphragm is transferred to the sensor diaphragm.

2. A pressure transducer as set forth in claim 1, wherein the two capacitor plates are joined together at their centers to minimize alignment problems.

3. A pressure sensor as set forth in claim 2, wherein said deformable diaphragm has a central zone surrounded by an annular zone, and the second plate is constituted by a central disc which is joined by a stud to the central zone and is spaced therefrom by a washer, the disc being surrounded by an annular insulating ring that is in turn surrounded by an annular metal plate, said metal plate and said annular zone constituting the plates of the capacitor.

4. A pressure transducer as set forth in claim 1, wherein said assembly further includes a pipe connector clamped against the base section of the body component to carry the fluid whose pressure is to be measured against the barrier diaphragm, said connector being fabricated of a metal compatible with the fluid.

5. A pressure sensor as set forth in claim 4, wherein said pipe connector is provided with an outwardly-extending flange and is clamped thereto by a shell surrounding the base section and a sleeve telescopically threaded in said shell and bearing against said flange.

6. A pressure sensor as set forth in claim 5, further including an annular sealing ring at the interface of the flange and the underside of the base section.

7. A pressure sensor as set forth in claim 6, wherein the inner wall of the sleeve is spaced from the flange of the connector to provide a leakage path, said sleeve having drainage holes communicating with the leakage path.

8. A transducer as set forth in claim 1, wherein said air gap is filled with a fluid immiscible with water and having a relatively high dielectric constant to render the sensor immune to the effects of humidity.

9. A transducer as set forth in claim 8, wherein said fluid is degassed silicone oil.

* * * * *

UNITED STATES PATENT OFFICE
CERTIFICATE OF CORRECTION

Patent No. 4,227,418  Dated October 14, 1980

Inventor(s) John J. Bonner & William Clayton

It is certified that error appears in the above-identified patent and that said Letters Patent are hereby corrected as shown below:

Column 1, line 55 delete "not"

Signed and Sealed this

Twenty-fifth Day of August 1981

[SEAL]

Attest:

Attesting Officer

GERALD J. MOSSINGHOFF

Commissioner of Patents and Trademarks